United States Patent [19]
Srivastava

[11] Patent Number: 5,457,799
[45] Date of Patent: Oct. 10, 1995

[54] OPTIMIZER FOR PROGRAM LOOPS

[75] Inventor: Amitabh Srivastava, Menlo Park, Calif.

[73] Assignee: Digital Equipment Corporation, Maynard, Mass.

[21] Appl. No.: 204,835

[22] Filed: Mar. 1, 1994

[51] Int. Cl.⁶ .................................................. G06F 9/44
[52] U.S. Cl. .................. 395/700; 364/DIG. 1; 364/280.5
[58] Field of Search .................................. 395/700, 650

[56] References Cited

U.S. PATENT DOCUMENTS

| | | | |
|---|---|---|---|
| 4,656,682 | 4/1987 | Chaitin et al. | 364/300 |
| 5,193,190 | 3/1993 | Janczyn et al. | 395/700 |
| 5,202,995 | 4/1993 | O'Brien | 395/700 |
| 5,212,794 | 5/1993 | Pettis et al. | 395/700 |
| 5,303,377 | 4/1994 | Gupta et al. | 395/700 |

*Primary Examiner*—Kevin A. Kriess
*Attorney, Agent, or Firm*—Dirk Brinkman; Ronald C. Hudgens; Arthur W. Fisher

[57] ABSTRACT

In a method for optimizing loops of a program, the program is partitioned into a plurality of procedures, each procedure including instructions related for execution. A program call graph is constructed for the program, the call graph indicating the flow of execution among the several procedures. A specific one of the procedures is identified as a dominating procedure if the specific procedure is executed more than once. Procedures called from the dominating procedure are identified as descendent procedures. The descendent and dominating procedures are designated as a loop region. Any of the descendent procedure which are called by any of procedures of the program other than the dominating procedure and the descendent procedure are identified as step procedures. Step procedures are removed from the loop region. Instructions of the loop region that do not change the execution state of the computer are removed from the loop region in a sequence as determined by the frequency of execution of such instructions.

7 Claims, 4 Drawing Sheets

OPTIMIZER FOR PROGRAM LOOPS

FIELD OF THE INVENTION

This invention relates generally to computer systems, and more particularly to optimizing programs for executing in computer systems.

BACKGROUND OF THE INVENTION

Users of a computer system typically define processes to be performed by the system in a source language program. Program translation tools, such as compilers, linkers, and assemblers, can be used to convert the source language program to machine executable form. The utilization of computer resources can be minimized if the translation tools optimize the program during this conversion.

A typical program usually includes one or more execution loops to perform specific processing task more than once. Coding repeated processing steps as a loop reduces the size of the program. However, loops tend to increase execution time, since additional instructions are required to cycle through the loop, and to detect loop terminating conditions.

Some translation tools attempt to optimize loops simply by duplicating the instructions of the loop in-line so that the instructions can be executed strictly sequentially. "In-lining" may be a reasonable solution for loops with a small number of cycles. However, for loops which cycle a large number of times, in-lining is not a viable solution.

In addition, unless cache behavior is considered, in-lining can have unpredictable and sometimes detrimental effects on the performance of the cache. Also, simply duplicating instructions can overwhelm existing optimizing techniques, sometimes causing them to stop functioning, or confusing the optimization to the point that performance is actually degraded.

In another loop optimization technique, attempts are made to detect and move "invariant" code. Invariant code are any instructions of the loop which do not change the state of the computer system while executing the loop. Moving the invariant code from the loop can significantly decreases processing time. Invariant code can be detected by examining the operator and operands of the instructions of the program. Mechanisms which detect invariant code in simple loops are well understood.

However, most know optimizing techniques have problems recognizing the exact span of complex loop, such as nested loops and intersecting loops. Nested loops are loops within loops, and intersecting loops are loops which may be executed from more than one point external to the loop. Thus, known optimizing techniques can always capitalise on all invariant code motion opportunities.

Therefore, there is a need for an optimizing technique which can accurately determine the full span of loops within a program, and move invariant code across loop boundaries to increase processing efficiencies.

SUMMARY OF THE INVENTION

In a method for optimizing loops of a program, the program is partitioned into a plurality of procedures, each procedure including instructions related for execution. A program call graph is constructed for the program, the call graph indicating the flow of execution among the several procedures. A specific one of the procedures is identified as a dominating procedure if the specific procedure is executed more than once. Procedures called from the dominating procedure are identified as descendant procedures. The descendent and dominating procedures are designated as a loop region. Any of the descendant procedure which are called by any of procedures of the program other than the dominating procedure and the descendant procedure are identified as step procedures. Step procedures are removed from the loop region. Instructions of the loop region that do not change the execution state of the computer are removed from the loop region in a sequence as determined by the frequency of execution of such instructions.

DETAILED DESCRIPTION OF A PREFERRED EMBODIMENT

Figure 1:
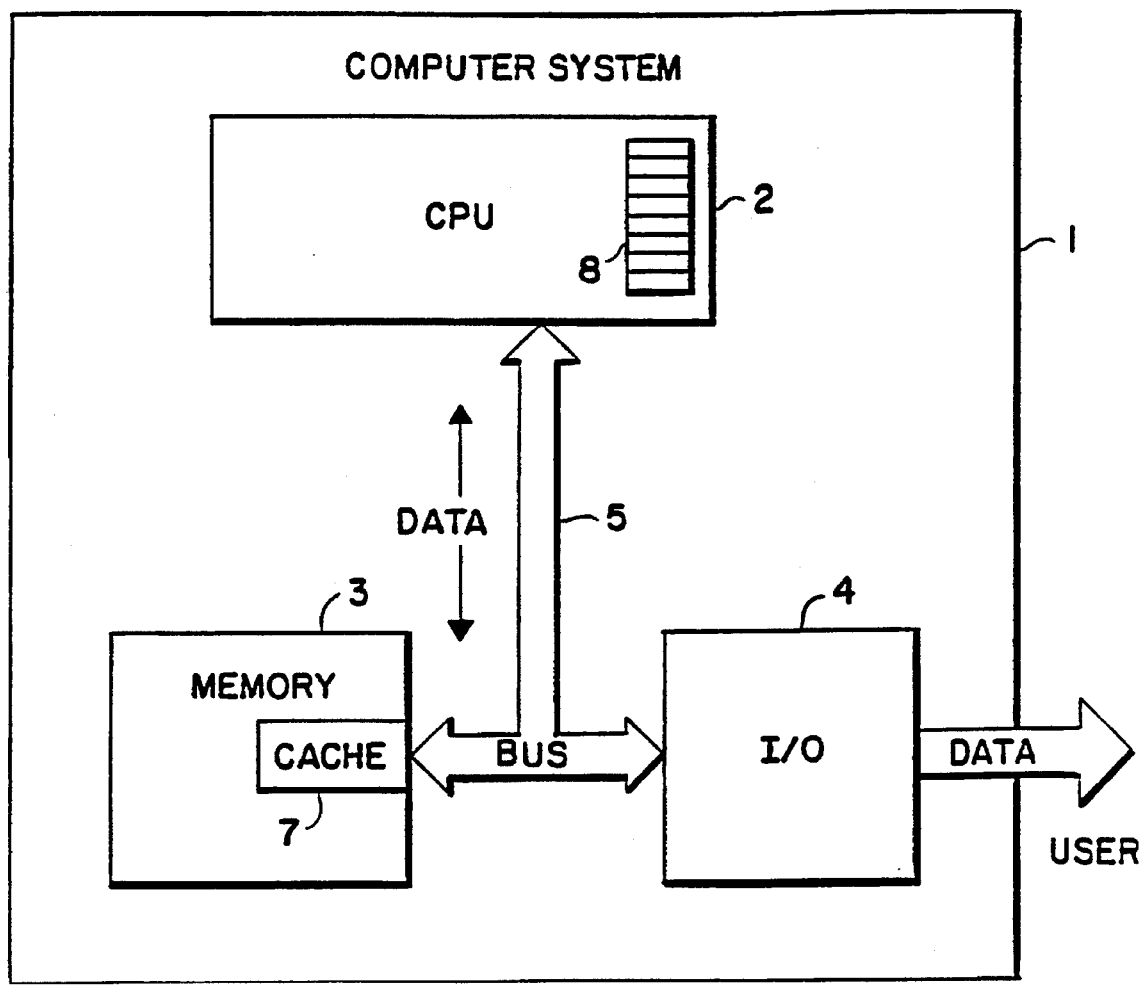
FIG. 1 is a block diagram of a computer system which can use the loop optimizer of the present invention.

FIG. 1 shows a computer system 1 including a CPU 2, a memory 3, and an I/O 4 coupled to each other by a bus 5. The computer system 1 can be a personnel computer, a work-station, a main-frame, or part of a network of computers executing process steps independently, or in parallel.

With respect to the component structures of the computer system 1, the CPU 2 may be of a variety of architectures, CICS, RISC and the like. The memory 3 can include a cache 7 to accelerate the data flow between the CPU 2 and the memory 3. The structure of the bus 5 is general, and can include dedicated high-frequency data paths, signaling in parallel, for example between the cache 7 and the CPU 2. The I/O 4 can include input and output interfaces for acquiring and distributing data.

During operation of the computer system 1, data and processing steps, in the form of machine executable machine code, are acquired by the CPU, usually from the memory 3 via the bus 5. The data and the executable code are usually pennanently retained by the I/O 4, and loaded into the memory 3 as needed. While processed by the CPU 2, the data can be stored in a set of registers 8.

Figure 2:
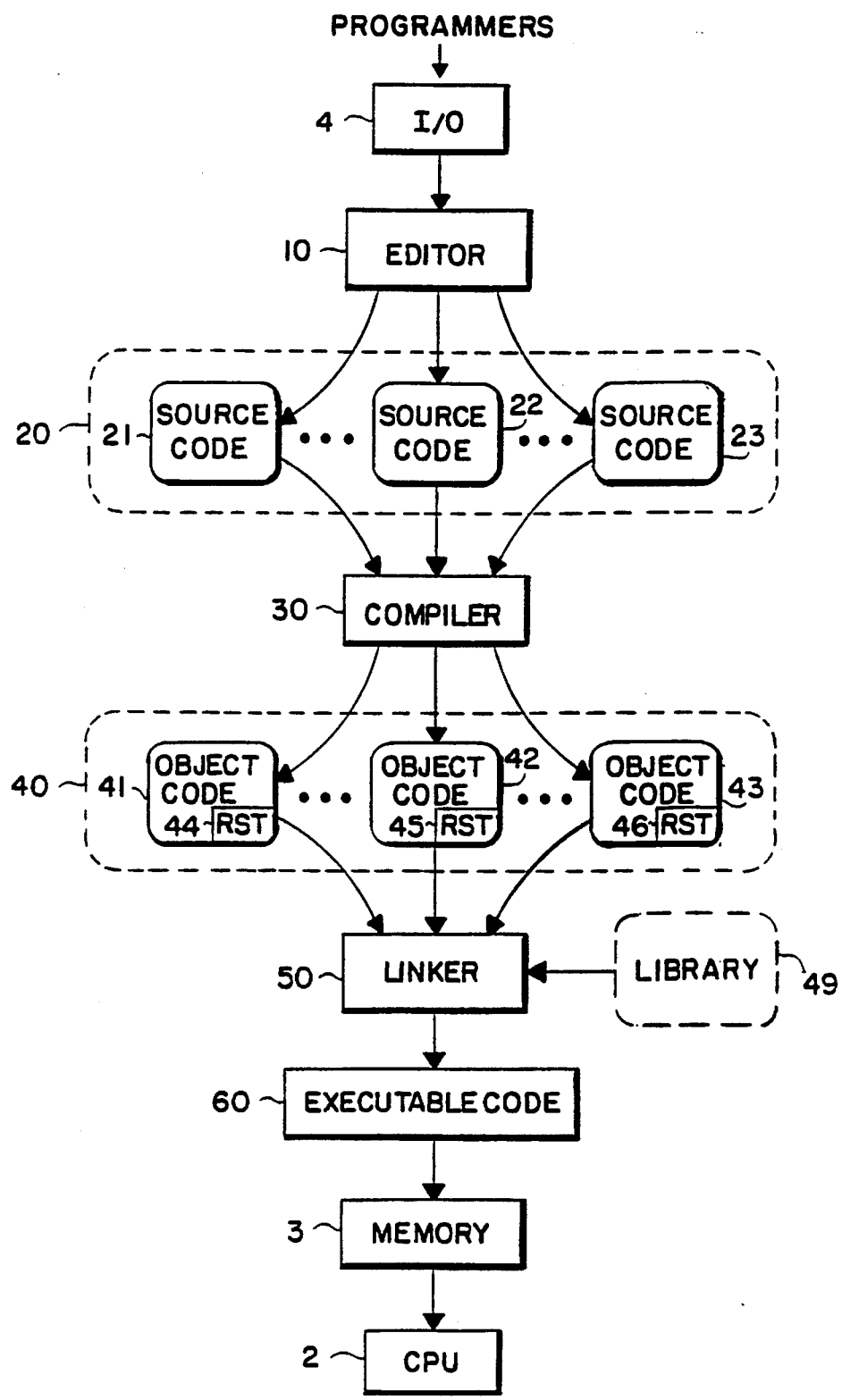
FIG. 2 a block diagram of a process to translate programs into executable code for the computer system of FIG. 1.

FIG. 2 show the general process of translating programs written in a source language to machine executable form. Programmers, typically, via the I/O 4, create a program 20 written in a high-level machine-independent language using an editor 10. If the program 20 is very large, the program 20 is created as a library or collection of smaller programs, usually called source code modules 21–23. Editing smaller programs is more efficient than working on one large and very complex program.

The source code modules 21–23 are processed by a compiler 20 to translate the source code modules into object modules 41–43. Usually, there is a one-to-one correspondence between the source modules and the object modules. Each of the object module 41–43 can be associated with corresponding relocation and symbol tables (RST) 44–46. The RSTs 44–46 typically are used to resolve memory address assignments during linking.

A linker 50 can combine the object modules 41–43, and resolve logical to physical address translations at link-time with the associated RST 44–46. The linker 50 may also acquire pre-compiled code modules from a library 49. The library 49 includes, for example, frequently used or standard program segments or procedures. The linker 50 produces machine dependent executable code 60 which can be loaded in the memory 3 for subsequent execution by the CPU 2 of the computer system 1 of FIG. 1.

It is generally desired to optimize the machine executable code. Optimization can be performed either by the compiler, the linker, or assemblers which can be used separately to translate object code to machine code. The loop optimizer, according to the principles of the invention, can perform optimization among procedures (inter-procedural optimization), and optimization within a procedure (intra-procedural optimization).

Loops are defined as any repeated execution of instructions. "Invariant code" are instructions which do not change the execution state of the computer system 1 during the execution loop. In other words, invariant code does not alter data. Removing the invariant code form the loop shortens the loop and lessens execution time. Execution loops can be deduced by iteration and recursion. Invariant code is detected by examining the operator and operands of instructions. For example, instructions which load addresses are guaranteed to be invariant.

Loop-invariant code which does not modify variables from one iteration of a loop is a well described optimizing opportunity. Mechanisms which detect loops and recognize loop-invariant code are well understood for single procedures optimized by compilers. However, recognizing loops which can span an entire program, crossing procedure boundaries, is generally difficult, since loops may be contained within loops, and loops can intersect each other.

Traditionally, loops are identified as a set of program components which are tightly coupled by execution control and dominated by another external program component. The problem of finding inter-procedural loops is solved by studying the execution path through the program components of the entire program in a top-down manner. This is done by first constructing a program call graph for the major program components of the program.

Figure 3:
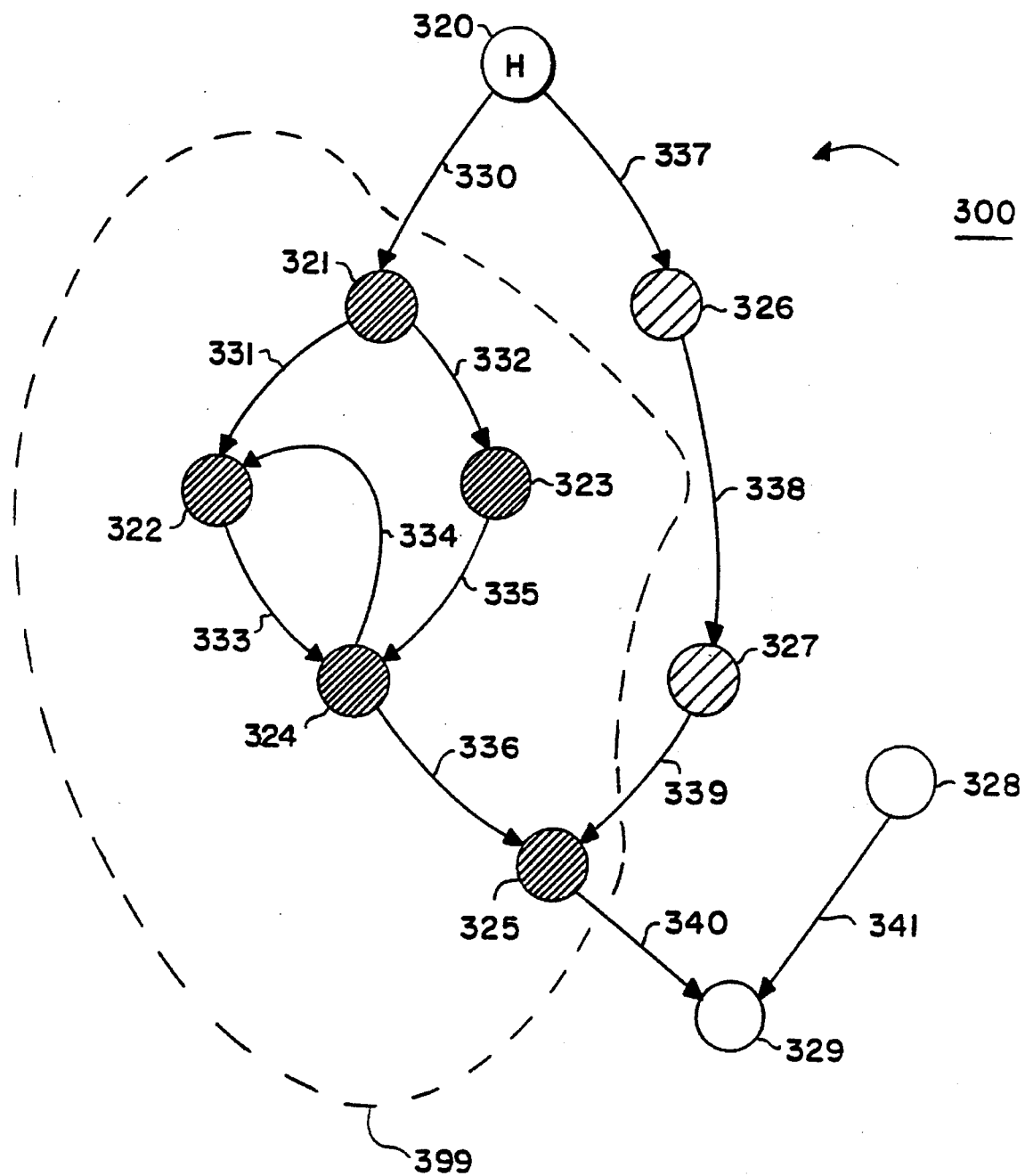
FIG. 3 is a program call graph for a program having loops to be optimized.

The major program components typically are called procedures of the program or "nodes" of the call graph. For example, FIG. 3 shows a program having procedures 320–329 calling each other as defined by a program call graph 300 having calling edges 330–341. The calling edges 330–329 are the "interfaces" between the procedures, e.g., the edges indicate the execution flow among the procedures 330–341. The procedures of the program are indicated by the circles, and the edges of call graph 300 is indicated by the directed arrows.

First, a "heavy" or dominating procedure is identified. A heavy procedure could be any procedures that is visited, for example, more than once during execution. The procedure which transfers execution to the heavy procedure is designated to be a loop header procedure.

Figure 4:
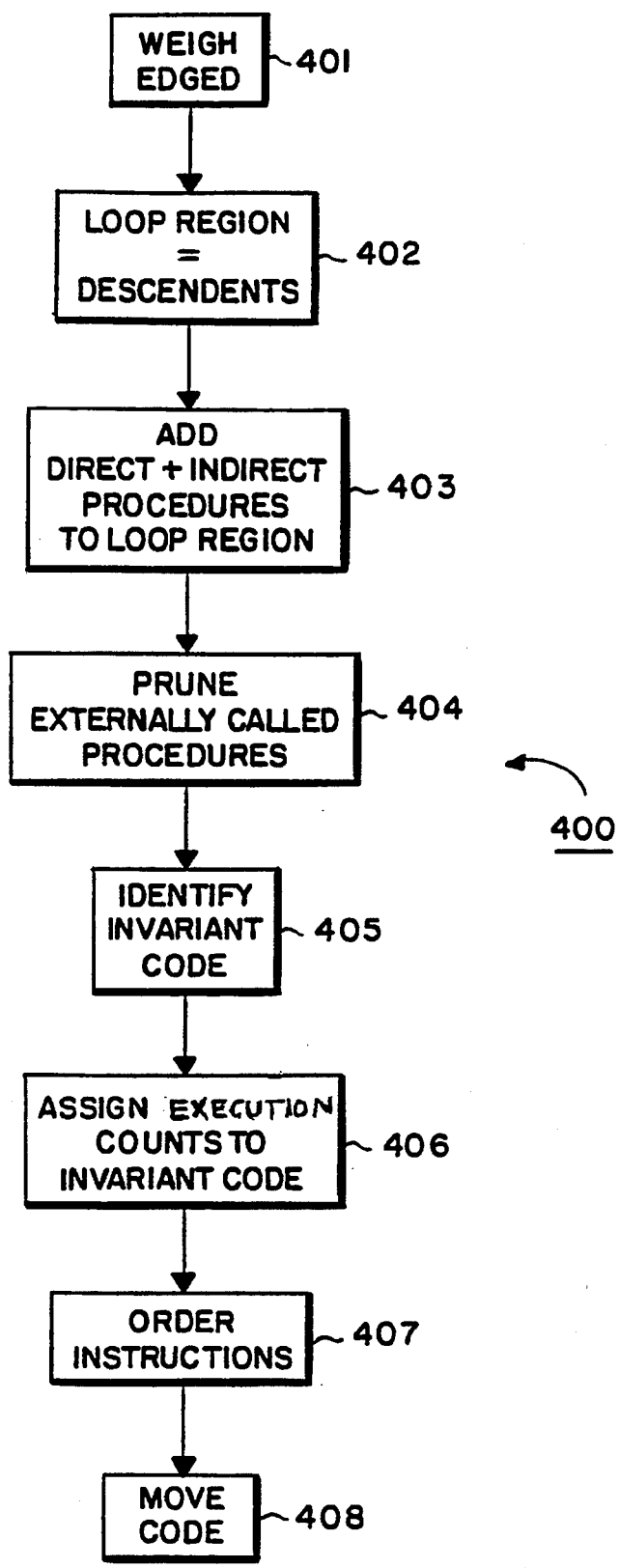
FIG. 4 is a flow diagram of a procedure to find a loop region of the program of FIG. 3.

Now also with reference to both FIG. 4 the procedure for optimizing loops is described in greater detail. In step 401, each of the edge 330–341 is weighted by an estimate of the number of times that the execution path will cross the edge. These estimated weights are derived from loop iterations and recursions. To estimate the weight of an edge, the weight is first set to zero. For each call to a successor procedure, add ten raised to a power which is equal to the number loops which contain the calling side of the edge, e.g., the call block. Then for each recursive call to the called successor procedure multiply the weight of the edge by ten. The weight of each of the edges is independently determined. The weight do not accumulate as the edges of the call graph 200 are followed. For example, the weight of edge 334 is independently computed from the weight of the surrounding edges 330, 331, 332, 333, 335, and 336.

Using the weighted call graph 300, in step 402 determine an initial loop region. A call edge with a large weight implies the presence of some loop region because the successor procedures are called repetitively by a dominating procedure. If the program call graph 300 were to have the form of a tree, the loop region of the tree would include the called procedure 321 and all its descendants, for example the procedures 321, 322, 323, 324, 325, and 329.

However, very few real programs have call graphs in the form of a tree. Therefore, additional steps must be taken to isolate the loop region. In step 403, any procedures, directly or indirectly connected to the calling procedure are added to loop region, for example, procedures 326 and 327 shown cross-hatched.

In step 404, any procedures in the loop region which are also called by procedures outside the loop region are pruned from the loop region. The remaining procedures are determined to be the loop region. An example of the procedure 400 is detailed in Appendix B in a form suitable for programming.

The resulting loop region, generally indicated by a broken line 399 may include procedures which include call blocks to transfer execution control to procedures outside the region, for example procedure 329. Such procedures are called step procedures of the loop region 399. Step procedures should be considered part of the loop region. However, since step procedures are reachable from outside the loop region it is not safe to migrate loop-invariant code across them.

Also, if the loop header procedure 320 does not dominate the loop region 399, the region is pruned so thoroughly that it only contains the header procedure 320 itself. In this case, any remnants of the loop are contained in the header procedure, and only the basic blocks of the header procedure 320 can become candidates of code motion. If the loop arose because the successor procedure called the "header" procedure recursively, then the header procedure contains no instructions eligible for moving.

After the boundaries of the loop region have been established, the next task is to identify all instructions which are invariant within the loop region, see step 405. For example, a frequently used type of instruction which is always invariant is a load-memory address into register operation.

In step 406, each candidate invariant instruction is assigned an estimated execution count. The execution count combines the number of machine cycles required to execute the instruction by the depth of the loop within the procedure and by the weight of the edges on the call graph edges leading to the procedure.

Next, in step 407, the candidate invariant instructions are ordered according to the combined execution counts. In step 408, those instructions which will yield the highest payback, e.g., instructions having higher execution counts, will be allocated to available registers in rank order, until the supply of available registers for the loop region is exhausted.

In the preferred embodiment of the invention, available registers are identified as follows. An available register can not be referenced anywhere in the loop region, except possibly the temporary use of the register to save and restore variables during the execution of the header procedure 320.

An unreferenced register is available if it is not-used at the exit of the header procedure, or if it is not used at the exit of the step procedures, or if it is unreferenced in any of the step procedures or their descendants.

For each available and identified register, the next heaviest loop-invariant instruction is removed from the loop region. Each removed instruction is replaced with a register-to-register copy instruction to ensure that the variable is stored in the correct location.

The process steps of identifying a loop region, weighing loop-invariant instructions, ordering the loop-invariant instructions, and identifying available registers to hold the variables of loop-invariant instructions are performed for each of the edges 330–341 of the program call graph 300 with a weight greater than unity. After inter-procedural code has been moved, any loop-invariant code within a procedure is relocated.

The advantages of the claimed invention are particularly applicable to any translations which are used to convert source code programs to executable form, such as compilers, linkers, and assemblers.

Appendices A illustrate specific procedures of the inventions suitable for implementation in a computer system.

It will be apparent to those skilled in the art that various modifications can be made to the present invention without departing from the spirit and scope of the invention as set out in the appended claims.

APPENDIX A
Construction of an interprocedural loop

Input: A call graph $C = (P,E)$ where $P$ is the set of procedures and $E$ is the set of call edges, a depth first spanning tree $D$ of $C$, and an edge $e = (p_h \rightarrow P_e)$

Output: LoopRegion($e$), a subset of the procedures of $C$.

A Method:

First, for LoopRegion $\subseteq$ the decendants in D of $p_h$ build initial set of nodes reachable from $p_e$.*

```
constant:Family = {p|p is a descendant of p_h in D}
      LoopRegion = {p_h,p_e}
while changes to set LoopRegion do
      for each p in family-{p_h}, in depth-first order, do
            if p ∈ LoopRegion then
                  for each procedure q that p calls do
                        if q ∉ LoopRegion and q ∈ Family then
                              LoopRegion = LoopRegion ∪ {q}
```

Then, add callers of nodes already in region, if all callers are in the family

```
while changes to set LoopRegion do
  for each q in Family, in reverse-depth-first order, do
      if q ∈ LoopRegion then
            addcallers = true
            for each procedure p that calls q do
                  if p ∉ Family then addcallers = false
            if addcallers then
                  for each procedure p that calls q do
                        if p ∉ LoopRegion then
                              LoopRegion = LoopRegion ∪ {p}
```

And, ensure that the loop region is dominated by a single entry point

```
while changes to set LoopRegion do
      for each q in Family-{p_h}, in depth-first order, do
            if q ∈ LoopRegion then
                  for each procedure p that calls q do
                        if p ∉ LoopRegion then
                              LoopRegion = LoopRegion - {q}
```

APPENDIX B

Variable Liveliness Analysis Procedure

Stage I

Remove return edges and compute LIVE ("may be live") and DEAD ("must be dead") information for procedure B and with a successor procedure S.

*Normal Blocks:*

| | | |
|---|---|---|
| DEF[B] | = | variables defined by B before any use in B |
| USE[B] | = | variables used in B before any definition in B |
| LIVEIN[B] | = | USE[B] $\cup$ LIVEOUT[B] - DEF[B] |
| LIVEOUT[B] | = | $\cup_s$ LIVEIN[S] for all successors S of B |
| DEADIN[B] | = | DEF[B] $\cup$ DEADOUT[B] - USE[B] |
| DEADOUT[B] | = | $\cup_s$ DEADIN[S] for all successors S of B |

*Call and Return blocks.*

| | | |
|---|---|---|
| LIVEOUT[call] | = | LIVEIN[entry] $\cup$ LIVEOUT[return] - DEADIN[entry] |
| LIVEOUT[return] | = | $\cup_s$ LIVEIN[S] for all successors S of return |
| DEADOUT[call] | = | DEADIN[entry] $\cup$ DEADOUT[return] - LIVEIN[entry] |
| DEADOUT[return] | = | $\cap_s$ DEADIN[S] for all successors S of return |

LIVEIN sets for a call or return block are identical to its LIVEOUT sets

When this converges, define, for each procedure P:

| | | |
|---|---|---|
| PUSE[P] | = | LIVEIN[B] where B is the entry to P |
| PDEF[P] | = | DEADIN[B] where B is the entry to P | and then throw away the LIVE and DEAD sets computed in this phase.

Stage II

Restore return edges and delete call edges, and compute live (may be live) information for:

*Normal blocks:*

| | | |
|---|---|---|
| DEF[B] | = | variables defined by B before any use in B |
| USE[B] | = | variables used in B before any definition in B |
| LIVEIN[B] | = | USE[B] $\cup$ LIVEOUT[B] - DEF[B] |
| LIVEOUT[B] | = | $\cup_s$ LIVEIN[S] for all successors S of B |

*Calll and Return Blocks procedure P:*

| | | |
|---|---|---|
| LIVEOUT[call] | = | PUSE[P] $\cup$ LIVEOUT[return] - PDEF[P] |
| LIVEOUT [return] | = | $\cup_s$ LIVEIN[S] for all successors S of return |

LIVEIN sets for a call or return block are identical to its LIVEOUT sets.

What is claimed is:

1. A computer implemented method for optimizing loops of a program, comprising the steps of:

partitioning the program into a plurality of procedures, each procedure of said plurality of procedures including instructions related for execution;

constructing a program call graph for the program, said program call graph to indicate a flow of execution among said plurality of procedures;

identifying a specific one of said plurality of procedures as a dominating procedure, a dominating procedure being one of said plurality of procedures that calls any of said plurality of procedures more than once;

identifying a particular procedure of said plurality of procedures as a descendant procedure of said dominating procedure, said second procedure being called by said dominating procedure, said descendant procedure and said dominating procedure designated as a loop region;

identifying said descendant procedure as a step procedure when said descendant procedure is called by any of said plurality of procedures other than said dominating procedure and said descendant procedure;

removing said step procedure from said loop region.

2. The method as in claim 1 further comprising:

identifying specific instructions of said loop region as invariant instructions when said specific instructions do not change an execution state of the computer while executing said specific instructions of said loop region;

determining the number of times each of said invariant instructions will be executed;

ordering said invariant instructions according to the number of times said invariant instructions will be executed;

moving said invariant instructions from said loop region in a sequence as determined by said ordering of said invariant instructions.

3. A computer implemented method for optimizing loops of a program to be executed in a computer system, comprising:

partitioning the program into a plurality of procedures;

constructing a program call graph for the program;

identifying dominating procedures of said plurality of procedures, each of said dominating procedures calling any of the plurality of procedures more than once;

identifying descendant procedures of the dominating procedures, the descendant procedure being called via the dominating procedures;

designating the descendant procedures and the dominating procedures as a loop region;

identifying step procedures of the loop region, the step procedures being called by any of the plurality of procedures other than the dominating procedures and the descendant procedures;

removing the step procedure from the loop region.

4. The method as in claim 3 further comprising:

identifying invariant instructions of the plurality of procedures, the invariant instructions to maintain an execution state of the computer while executing;

determining the number of times each of the invariant instructions will be executed;

ordering the invariant instructions according to the number of times each of the invariant instructions will be executed;

moving said invariant instructions from said loop region in a sequence as determined by the ordering of the invariant instructions.

5. The method as in claim 3 wherein the program call graph includes nodes and edges, each node representing one of the plurality of procedures, and each edge representing an execution interface between a calling one of the plurality of procedures, and a called one of the plurality of procedures, further comprising:

assigning a value to each of the edges of the program call graph, the value representative of the number of times that the edge is traversed during an execution of the program;

weighing each value of each edge of the program call graph by a relative depth of the edge in the loop region;

ordering the edges according to the weighted values of each of the edges;

identifying invariant code in the loop region, the invariant code to maintain an invariant state of the computer system; and moving the invariant code from the loop region according to the ordering of the edges of the program call graph.

6. The method of claim 5 further comprising:

initially setting the weighing of each value of each edge to a value of zero; and increasing the weighing of each value of each edge by a factor of ten for each level of nesting of the edge in the loop region.

7. The method of claim 4 further comprising:

allocating registers of the computer system to invariant code as determined by the ordering of the invariant code until all registers have been allocated.

* * * * *